United States Patent [19]

Ecker

[11] Patent Number: 4,951,411
[45] Date of Patent: Aug. 28, 1990

[54] ELECTRICALLY OPERATED FISHING JIGGER

[76] Inventor: Vern J. Ecker, Box 871, Lynn Lake, Manitoba, Canada, R0B 0W0

[21] Appl. No.: 406,078

[22] Filed: Sep. 12, 1989

[30] Foreign Application Priority Data

Sep. 13, 1988 [CA] Canada ................................. 577268

[51] Int. Cl.$^5$ .............................................. A01K 97/10
[52] U.S. Cl. ....................................... 43/19.2; 43/26.1
[58] Field of Search ................................. 43/19.2, 26.1

[56] References Cited

U.S. PATENT DOCUMENTS

| | | | |
|---|---|---|---|
| 3,001,317 | 9/1961 | Boughton | 43/19.2 |
| 3,550,302 | 12/1970 | Creviston et al. | 43/19.2 |
| 3,600,837 | 8/1971 | Bristol | 43/19.2 |
| 3,645,040 | 2/1972 | Milburn, Jr. | 43/26.1 |
| 4,081,922 | 4/1978 | Johnson | 43/19.2 |
| 4,251,939 | 2/1981 | Tiede | 43/26.1 |
| 4,597,215 | 7/1986 | Otremba | 43/19.2 |
| 4,603,499 | 8/1986 | Simborski | 43/19.2 |

Primary Examiner—Richard K. Seidel
Assistant Examiner—James Miner
Attorney, Agent, or Firm—Irell & Manella

[57] ABSTRACT

Automatic fishing jiggers normally have the rod either secured to the mechanism or resting on the upper side of a cam or crank so that they cannot release but must flex from the point of attachment. The present device is mounted by the butt end thereof upon a coil spring which is anchored to a base and is positioned so that the rod extends upwardly and outwardly at an angle and is maintained by the spring in contact with the underside of a rotatable cam which moves the rods downwardly against the spring pressure. When a strike occurs, the rod is pulled downwardly to the base and/or the ice surface, against the pressure of the spring and is supported along the majority of its length against undue flexing.

20 Claims, 2 Drawing Sheets

ELECTRICALLY OPERATED FISHING JIGGER

This invention relates to new and useful improvements in electrically operated jiggers designed for use in ice-fishing or clamped to the seat of a boat.

It is well known, that when still fishing, vertical reciprocal motion of the bait is desirable in order to attract fish and this action is normally caused by the fisherman raising and lowering the tip of the rod to cause this vertical reciprocation. However, this is a relatively tiring activity, particularly when still fishing through the ice and there are many mechanical jiggers provided to cause this reciprocation.

Prior art known to applicant comprises the following:

U.S. Pat. No. 3,001,317, Sept. 26, 1961, N. E. Boughton. This shows a device for vibrating a fishing pole which is rested on the device and has to be maintained in position by the operator grasping the handle of the fishing rod.

U.S. Pat. No. 3,550,302, Dec. 29, 1970, L. J. Creviston. This shows a device secured to the fishing pole and adapted to oscillate the line thereof and which released the line once a fish strikes the bate. The housing enclosing the components are mounted on an upright mounting post clamped to the rear or side of the fisherman's boat.

U.S. Pat. No. 3,600,837, Aug. 24, 1971, Howard A. Bristol. This shows a rod specifically designed for this use and mounted within a housing 16. Reciprocation of the rod around a pivot point is provided by a motor operated ratchet wheel.

U.S. Pat. No. 3,645,030, Feb. 29, 1972, Raymond E. Milburn. This shows a bobber with a hollow spherical float having a spring motor mounted therein for supplying reciprocation to the line depending therefrom.

U.S. Pat. No. 4,597,215, July 1, 1986, Harvey E. Otremba. This shows a rod receiving socket mounted within a structure which in turn is engageable with a support secured to the fisherman's boat. It is reciprocated by a time delay control rotatable member engaging the underside of the socket driven by an electric motor.

U.S. Pat. No. 4,603,499, Aug. 5, 1986, Anthony Simborski. This shows a motor driven trolling device mounted to the gunwale of a fishing boat to move the line backwardly and forwardly during the trolling action. The rod is moved horizontally from side to side to give the trolling action.

To the knowledge of the applicant, all of the present devices either include a rotatable crank to which the rod is affixed or a rotatable cam with the rod resting upon the upper surface of the cam. In either case, it is impossible to disconnect the rod from the mechanism when a fish strikes so that the full flexing action of the rod occurs at the point of connection to the mechanism.

By contrast, the present invention permits the rod to be completely disconnected from the rotating cam mechanism which causes the vertical action so that the rod is supported upon the base and upon the ice surface thus restricting the movement of the rod by the fish.

In accordance with the invention there is provided, a fishing jigger comprising in combination a substantially horizontal base, a source of power supported above said base, cam means rotatable in a substantially vertical plane by said source of power, support means on said base to support a fishing rod by the butt end thereof, said support means including a resilient connection to the butt end of the rod and supporting said rod diagonally upwardly and outwardly and underneath said cam means, said resilient connection normally urging part of said rod adjacent the butt end thereof, against said cam means, and fishing line reel means mounted on said base.

Another advantage of the invention is that the period of the reciprocation may be varied if desired, the speed or frequency of reciprocation may be varied if desired and tension control may be provided upon the reel from which the line extends.

Still another advantage of the invention is that it may be operated by a single-cell battery or, alternatively, may be operated from a conventional 12-volt battery normally present in a vehicle or boat.

Still another advantage of the invention is to provide a device which is easily carried in a convenient carrying case and which is simple in construction, economically manufactured otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
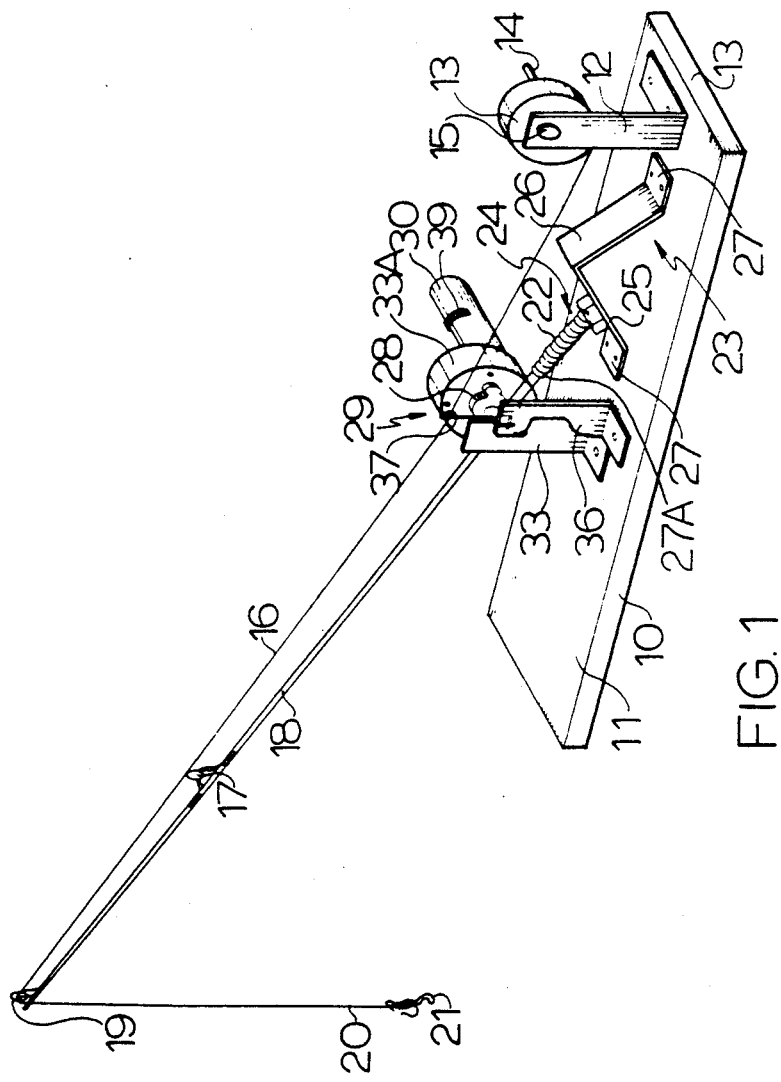
FIG. 1 is an isometric view of the invention mounted upon a rectangular base.
Figure 2:
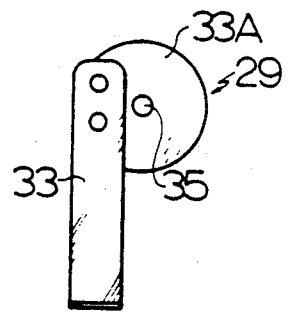
FIG. 2 is an enlarged side elevation of the support bracket and source of power.
Figure 3:
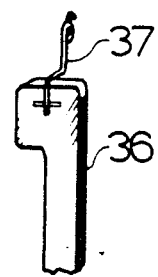
FIG. 3 is a fragmentary isometric view of the upper end of the bracket and a line guide supported thereby.

Proceeding therefore to describe the invention in detail, reference character 10 illustrates a substantially rectangular base preferably made from wood and having a planar upper surface 11 upon which the various components of the invention may be mounted.

A right angled bracket 12 is secured adjacent one end 13 of the base and extends upwardly therefrom substantially along the longitudinal axis of the base and a reel assembly 13 is journalled for rotation upon a spindle (not illustrated) which is secured to adjacent the upper end of the bracket 12 thus permitting the reel to be rotated in a vertical plane by means of handle 14. A conventional drag control mechanism 15 is also provided to control the tension of the fishing line 16 which extends from the reel through ferrules 17 of a resilient fishing rod pole 18 and through the tip 19 to hang vertically downwardly as shown at 20 and terminating in a hook 21 which may carry bait (not illustrated) in a conventional manner.

The butt end 22 of the rod is supported upon a bracket collectively designated 23 which in turn is secured to the upper surface 11 of the base forwardly of the bracket 12 and also substantially along the longitudinal axis thereof. A resilient connection collectively designated 24 extends from the bracket 23 and supports the rod 18 as will hereinafter be described.

The bracket, in this embodiment, includes the diagonal portion 25 upon which the rod is supported, and a brace portion 26 forming with the base, a substantially triangular configuration for strength and the end portions 27 of the bracket are secured to the upper surface 11 by means of screws or other fastening means.

Figure 4:
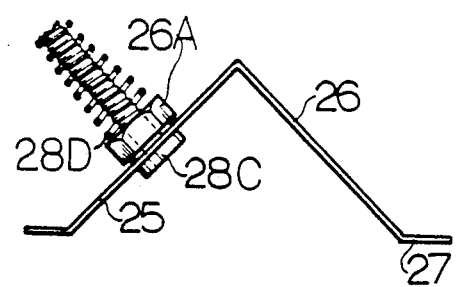
FIG. 4 is an enlarged fragmentary partially sectioned view showing the mounting of the coil spring to the bracket.

A bolt 28C shown in FIG. 4, engages through the portion 25 of the bracket and a nut 26A screw threadably engages the bolt shank on the opposite side of the head and secures the lower coil 28D of a coil spring forming the resilient connection 24.

The aforementioned butt end 22 of the rod 18 sockets into the upper end portion 27A of the spring thus giving a resilient connection to the rod which normally supports it in the upwardly and outwardly diagonal position illustrated in FIG. 1 and upon the underside of a cam 28 forming part of the source of power collectively designated 29. This source of power takes the form of an electric motor 30 operated by a one-cell battery 31 which drives a relatively small sprocket 32 within a cylindrical casing 33A on the end of the motor casing and which is supported adjacent the upper end of a support bracket 33 extending upwardly from the base and forwardly of the rod support bracket 23.

The relatively small sprocket or gear 32 engages a larger sprocket or gear 34 having a spindle 35 which extends outwardly of the casing 33A and carries the aforementioned cam 28 on the distal end thereof. The strength of the coil spring 24 is such that it just maintains the rod adjacent the butt end thereof in contact with the cam as it rotates. The cam, during its rotation, moves the rod downwardly and hence the tip in an arc against the pressure of spring 24 which maintains the rod in contact with the cam and returns it to the upper most position as the lobes 28A clear the rod 18.

A further bracket 36 carries a line guide ferrule 37 adjacent the upper end thereof through which the line 16 passes and is guided to the first rod ferrule 17 as clearly shown in FIG. 1.

It will also be observed that the rod is capable of being moved downwardly into contact with the upper planar surface 11 of the base 10 and upon the surface 38 of the ice (when being used for ice fishing) completely clear of the mechanism which causes the vertical reciprocation of the rod to occur.

Figure 5:
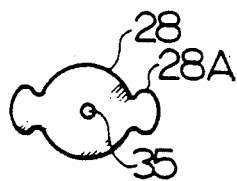
FIG. 5 is a front elevation of one type of cam.
Figure 6:
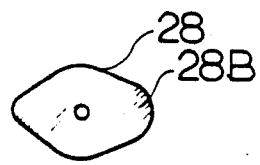
FIG. 6 is a front elevation of a further cam.
Figure 7:
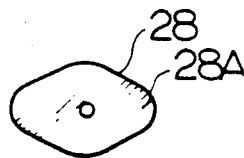
FIG. 7 is a front elevation of a still further cam.
Figure 8:
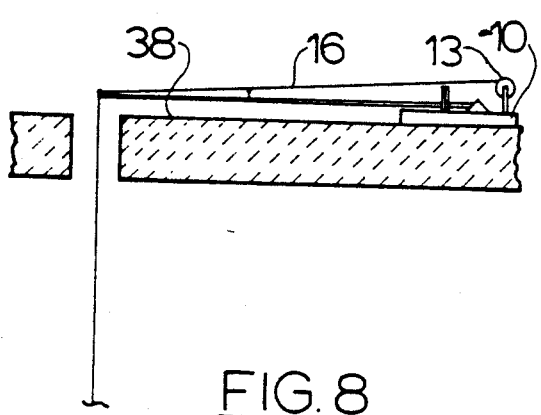
FIG. 8 is a fragmentary partially schematic view showing the rod in its lowermost position.
Figure 9:
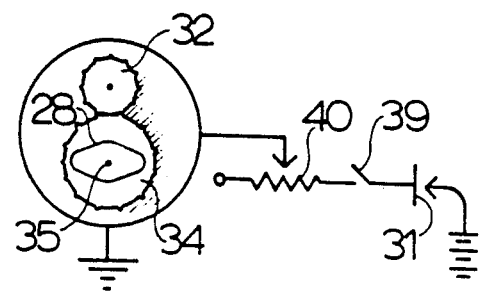
FIG. 9 is a schematic circuit diagram of the electrical apparatus of the rod of FIG. 1.

FIGS. 5, 6, and 7 show various cam designs with FIG. 5 having lobes 28A diametrically opposite one another and of the same configuration and size. In FIG. 6, the lobes 28B are of different heights thus giving a variety of movement to the rod tip and varying the period of or distance of the reciprocation. FIG. 7 shows lobes similar to FIG. 5 having the same height but of a relatively large lift thus increasing the distance of the reciprocation from that, for example, provided by the cam of FIG. 5. These cams are of course exemplary and various configurations and lifts may be provided depending upon the desires of the fisherman, it being understood that they can easily be changed when necessary.

In operation, the line 20 together with the hook assembly 21 is lowered into the water via reel 13 until the desired depth is reached whereupon the tension or drag is controlled by the knurled screw 15.

The motor 30 is switched on, by means of switch 39, which rotates the cam and thus provides the vertical jigging action to the hook assembly 21. If desired, a resistor 40 may be placed in circuit between the battery 31 and the motor 30 to control the speed of rotation of the cam 28 within limits and depending upon the desires of the fisherman.

When a fish strikes the hook 21, the rod is pulled downwardly against the pressure of the relatively light spring 24 and if ice fishing the rod engages the base 10 and the ice surface 38, which offers support thereto.

The assembly is easily dismantled by the removal of the rod from the resilient connector 24 and the remainder of the apparatus may easily be stored and carried within a carrying case (not illustrated) with the rod being secured to the outside thereof if desired.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fishing jigger comprising in combination a substantially horizontal base, a source of power supported above said base, cam means rotatable in a substantially vertical plane by said source of power, support means on said base to support a fishing rod by the butt end thereof, said support means including a resilient means for connecting to the butt end of the rod and supporting said rod diagonally upwardly and outwardly and underneath said cam means, said resilient means normally urging part of said rod adjacent the butt end thereof, against said cam means, and fishing line reel means mounted on said base.

2. The jigger according to claim 1 which includes means supported upon said base to guide a fishing line from said reel means to said rod.

3. The jigger according to claim 1 in which said resilient means takes the form of a coil spring secured by one end thereof to said base, the butt end of said rod socketing into the other end of said coil spring means.

4. The jigger according to claim 2 in which said resilient means takes the form of a coil spring secured by one end thereof to said base, the butt end of said rod socketing into the other end of said coil spring means.

5. The jigger according to claim 1 in which said rod means may flex downwardly to engage said base against pressure of said resilient means.

6. The jigger according to claim 2 in which said rod means may flex downwardly to engage said base against pressure of said resilient means.

7. The jigger according to claim 3 in which said rod means may flex downwardly to engage said base against pressure of said resilient means.

8. The jigger according to claim 4 in which said rod means may flex downwardly to engage said base against pressure of said resilient means.

9. The jigger according to claim 1 in which said cam means includes at least two lobes of different lifts whereby the period of reciprocation varies during one rotation of said cam means.

10. The jigger according to claim 2 in which said cam means includes at least two lobes of different lifts whereby the period of reciprocation varies during one rotation of said cam means.

11. The jigger according to claim 5 in which said cam means includes at least two lobes of different lifts whereby the period of reciprocation varies during one rotation of said cam means.

12. The jigger according to claim 6 in which said cam means includes at least two lobes of different lifts whereby the period of reciprocation varies during one rotation of said cam means.

13. The jigger according to claim 1 which includes means to vary the speed of rotation of said cam means and hence the frequency of the reciprocation of the tip of said rod.

14. The jigger according to claim 2 which includes means to vary the speed of rotation of said cam means and hence the frequency of the reciprocation of the tip of said rod.

15. The jigger according to claim 5 which includes means to vary the speed of rotation of said cam means and hence the frequency of the reciprocation of the tip of said rod.

16. The jigger according to claim 9 which includes means to vary the speed of rotation of said cam means and hence the frequency of the reciprocation of the tip of said rod.

17. The jigger according to claim 1 in which said fishing line reel means is adjacent one end of said base, said support means for said fishing rod is situated forwardly of said reel means and said source of power is situated forwardly of said support means for said fishing rod.

18. The jigger according to claim 2 in which said fishing line reel means is adjacent one end of said base, said support means for said fishing rod is situated forwardly of said reel means and said source of power is situated forwardly of said support means for said fishing rod.

19. The jigger according to claim 5 in which said fishing line reel means is adjacent one end of said base, said support means for said fishing rod is situated forwardly of said reel means and said source of power is situated forwardly of said support means for said fishing rod.

20. The jigger according to claim 9 in which said fishing line reel means is adjacent one end of said base, said support means for said fishing rod is situated forwardly of said reel means and said source of power is situated forwardly of said support mean for said fishing rod.

* * * * *